Jan. 7, 1964         G. K. C. HARDESTY         3,116,711
LIQUID LIGHTING FOR INDICATING INSTRUMENTS
AND DUO-PANEL STRUCTURES
Filed Oct. 31, 1960                                       4 Sheets-Sheet 2

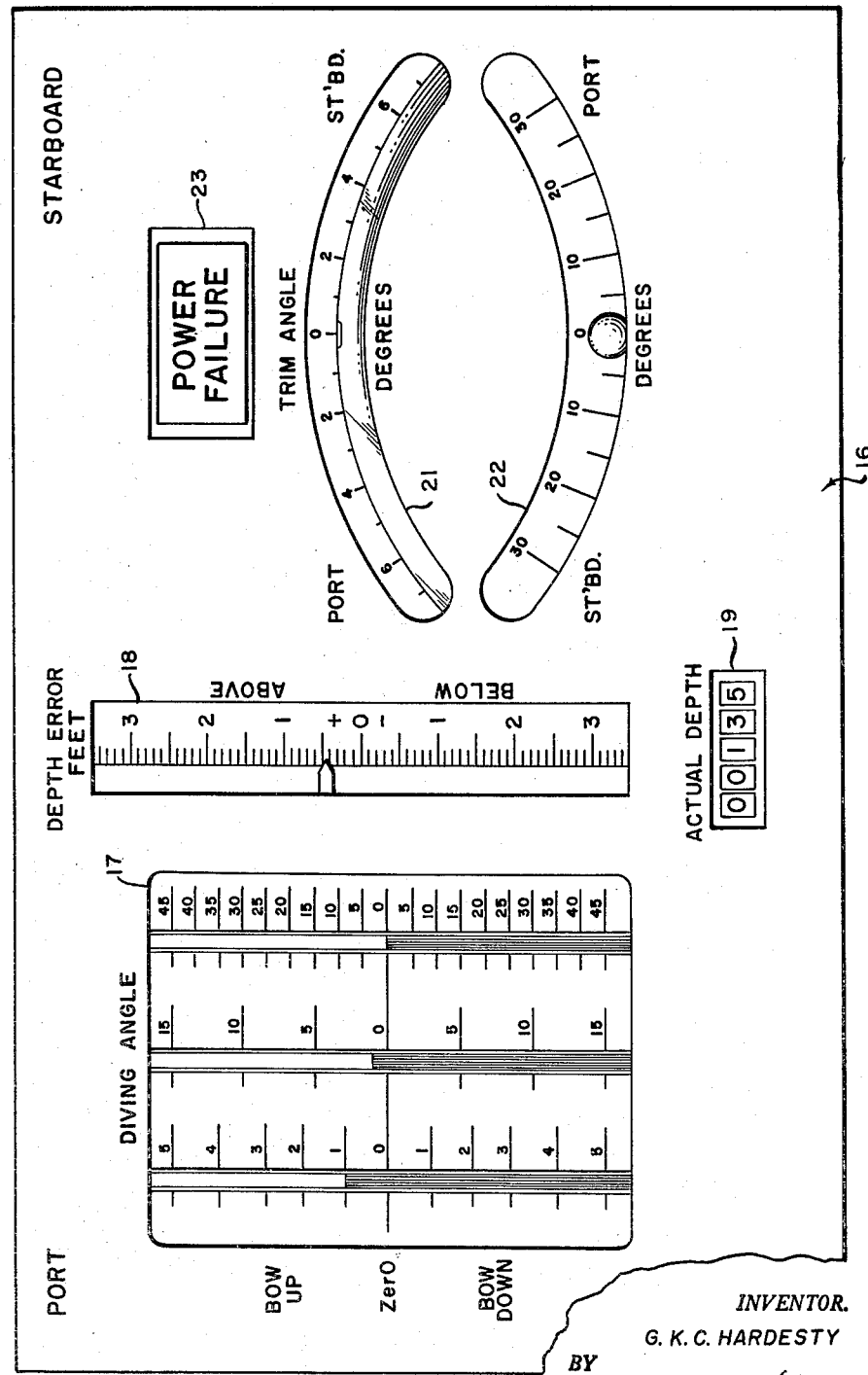
FIG. I.
INVENTOR.
G. K. C. HARDESTY
AGENT.

INVENTOR.
G. K. C. HARDESTY
BY
Howard W. Hermann
AGENT.

Jan. 7, 1964  G. K. C. HARDESTY  3,116,711
LIQUID LIGHTING FOR INDICATING INSTRUMENTS
AND DUO-PANEL STRUCTURES
Filed Oct. 31, 1960  4 Sheets-Sheet 3
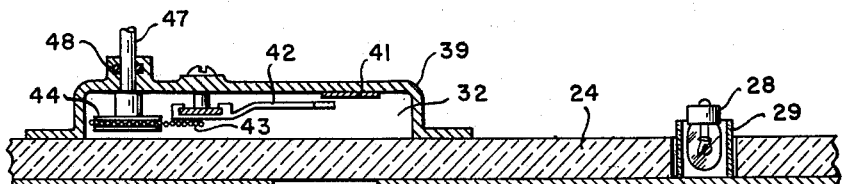
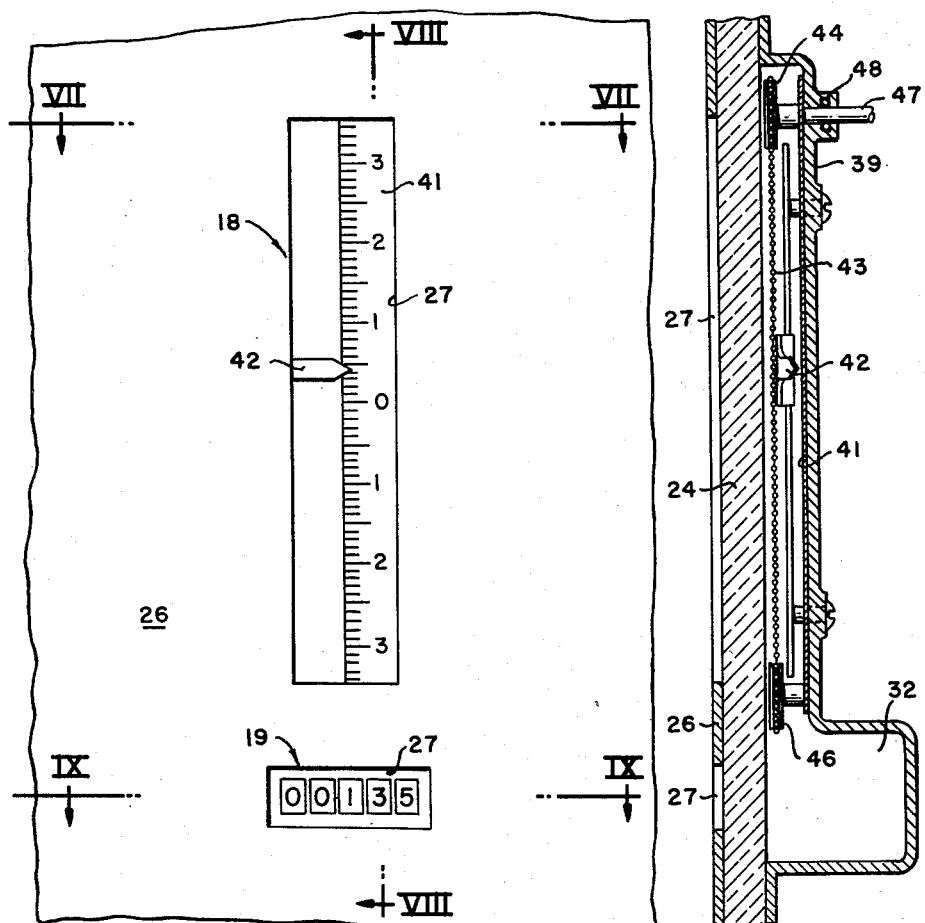
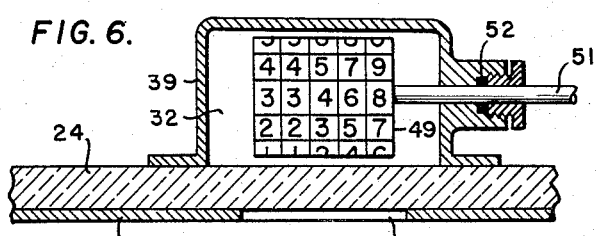
INVENTOR.
G. K. C. HARDESTY
BY
Howard W. Hermann
AGENT.

Jan. 7, 1964 G. K. C. HARDESTY 3,116,711
LIQUID LIGHTING FOR INDICATING INSTRUMENTS
AND DUO-PANEL STRUCTURES
Filed Oct. 31, 1960 4 Sheets-Sheet 4

INVENTOR.
G. K. C. HARDESTY
BY
AGENT.

United States Patent Office 3,116,711
Patented Jan. 7, 1964

3,116,711
LIQUID LIGHTING FOR INDICATING INSTRUMENTS AND DUO-PANEL STRUCTURES
George K. C. Hardesty, Box 156, Mayo, Md.
Filed Oct. 31, 1960, Ser. No. 66,363
14 Claims. (Cl. 116—129)
(Granted under Title 35, U.S. Code (1952), sec. 266)

The invention described herein may be manufactured and used by or for the Government of the United States of America for governmental purposes without the payment of any royalties thereon or therefor.

The present invention relates to instrument panel lighting and more particularly to the illumination of instrument panels by use of edge lighting.

Superior communication of information from measurement and computing devices to the human operator or "decision maker" is a requirement of all modern high performance man-machine systems. In systems such as the submarine or airplane, errors in indicating instrument interpretation can be immediately disastrous and may result in loss of life and valuable equipment, as well as failure of the assigned mission. The effectiveness of an indicating instrument involves the ability of the operator to read it. No matter how reliable and accurate an instrument may be, if it can not be read, it is useless. Among the factors involved in making an instrument readable, illumination is probably by far the most important.

Since the advent of highly transparent plastic sheet material, many suggested advances in the art of panel illumination, particularly edge lighting, have been made. Edge lighting, or edge illumination, makes use of the phenomenon of total internal reflection whereby light entering a panel at a selected point is conducted through the panel by reflection between the walls thereof to ultimately illuminate a desired area. In the instance of instruments involving moving pointers, the full application of edge lighting has been substantially restricted to those instruments in which the pointer could be made of plastic and the light could be piped from a zone of entry at the pointer hub to its tip. Partial applications in which plastic light conducting elements transmit light from miniature lamps to remote points and then distribute it through air to an opaque pointer have been of limited success since they require extremely critical design of the optical elements employed, and in practical application often degrade the illumination of the dial and permit glare light to escape at viewing angles approaching the parallel to the dial.

Applicant's prior Patent No. 2,703,547, granted March 8, 1955, was aimed at solving this problem. In this patent there was described an instrument lighting device wherein a pair of cover plates defined a liquid filled chamber in which the instrument pointers moved. The cover plates, which were transparent and had optically smooth surfaces, had a transparent ring member cemented between them, the ring member being made of acrylic material having an optically smooth cylindrical outer surface. The liquid through which the pointers moved was of an index of refraction approximating that of the plastic material from which the plates and ring member were made. Light was introduced into the liquid chamber from a source outside the cylindrical wall of the transparent ring and illuminated indicia painted on the inside of the back cover plate.

It is to be noted this type of arrangement, although solving the problems in some instances also suffered from disadvantages. The twin panel structure required a large amount of space which in some instances was unavailable. The use of transparent side and rear walls caused loss of light and decreased efficiency.

In the art of illuminating liquid-in-glass type instruments such as mercury-in-glass thermometers, manometers, bubble, ball or pendulum type inclinometers or odometer type digital or similar readout devices, there has hithertofore been no significant advance. Glass tubes and other cylindrical surface instruments suffer from highlight and glare lines that generally impede the reading of the instrument. Bubble type indicators, while sensitive, are very difficult to read because the bubble is characteristically seen only by highlights on its meniscus surface.

The instant invention solves the problems inherent in the prior art by the discovery that the elements to be illuminated can lie in planes other than the plane of lamps. Thus the light can be introduced from a single panel member into a fluid media behind the panel member in which the indicator is placed. Furthermore, it has been found that in a system of this type the rear wall of the liquid confining chamber need not be transparent, need not be of the same index of refraction as the liquid, and need not be the element bearing the fixed illuminated indicia. It has been found that the provision of liquid media of a selected index of refraction surrounding cylindrical indicator surfaces eliminates the glare lines which made prior art instruments of this type difficult to read.

It is an object of this invention to provide improved panel indicator illumination.

A further object is the provision of a panel indicator illumination system which occupies a minimum of space with maximum efficiency.

Another object is the provision of an illumination system for cylindrical elements containing liquid wherein the liquid is brightly illuminated.

A still further object is to provide an illumination system for cylindrical shaped instruments wherein glare lines are eliminated.

Other objects and many of the attendant advantages of this invention will be readily appreciated as the same becomes better understood by reference to the following detailed description when considered in connection with the accompanying drawings wherein:

FIG. 1 is a front view of an instrument panel made in accordance with the present invention;

FIG. 6 is a fragmentary view of FIG. 1 showing the depth and depth error indicators;

FIG. 7 is a cross-sectional view of the depth error indicator taken on line VII—VII of FIG. 6;

FIG. 8 is a cross-sectional view of the depth and depth error indicator taken on line VIII—VIII of FIG. 6;

FIG. 9 is a cross-section of the depth indicator taken on line IX—IX of FIG. 6;

Figure 3:
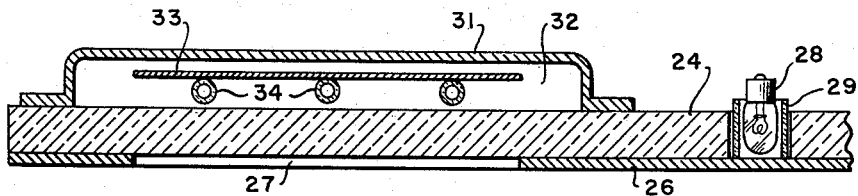
FIG. 3 is a sectional view of the diving angle indicator taken on line III—III of FIG. 2.
Figure 2:
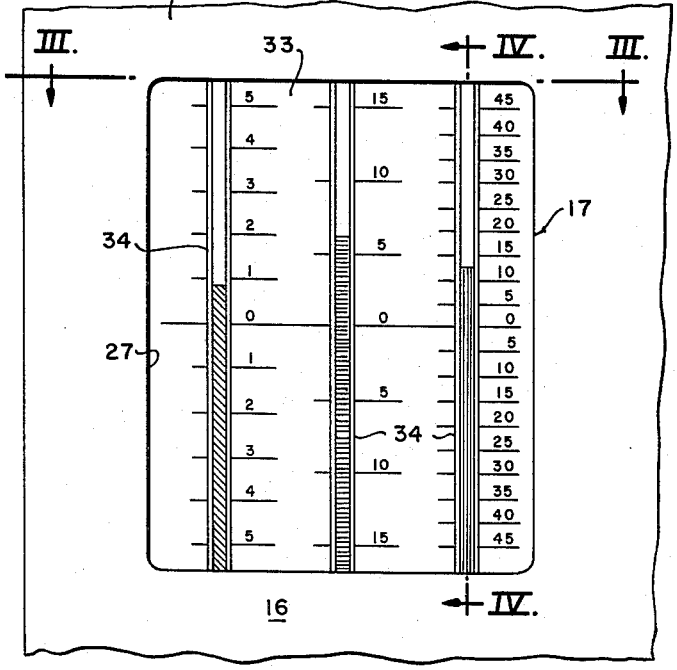
FIG. 2 is a fragmentary portion of FIG. 1 showing the diving angle indicator.
Figure 4:
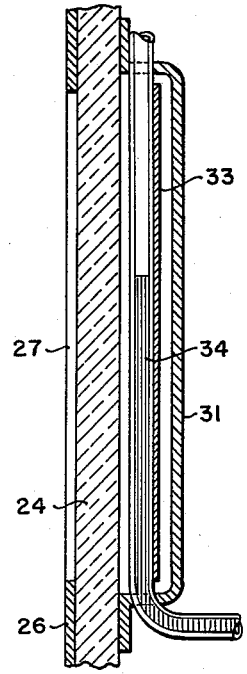
FIG. 4 is a sectional view of the diving angle indicator taken on line IV—IV of FIG. 2.

Referring now to the drawings, wherein like reference numerals designate like or corresponding parts throughout the several views there is shown in FIG. 1 a submarine instrument panel 16 made in accordance with the instant invention. Panel 16 has incorporated therein a diving angle indicator 17, a depth error indicator 18, an actual depth indicator 19, a pair of trim angle indicators 21, 22 and a power failure indicator 23.

Referring now to FIGS. 2–5 the panel construction and particularly the construction of the diving angle indicator 17 is shown in detail. Panel 16 is made up of a transparent light conducting panel 24 of glass, acrylic material or the like, and is covered by a bezel or indicia panel 26 which is of opaque material and has viewing openings 27 and indicia or legend openings. A light source 28, which may be encased in a color filter 29, is introduced into a hole in light conducting panel 24 and transmits light thereto and, in the manner known in the art as edge lighting, to the instruments carried by the panel.

The diving angle indicator 17 has a backing member 31 which is preferably made of metal having a mirrored or satin finished inner surface. Backing member 31 is secured to light conducting panel 24 in a manner to form a leakproof seal between the two members, thus forming a chamber which is filled with the liquid 32 as will hereinafter be described. Disposed within the chamber are a scale panel 33 and a plurality of transparent indicator tubes 34 containing fluid which by means of a hydraulic system varies in height in the tubes 34 in accordance with the diving angle of the submarine. The fluid in these tubes is commonly a petroleum base oil, a silicone base fluid or a heavy organic chemical compound. In accordance with the instant invention, the cavity or chamber is filled with light-transmitting liquid such as white mineral oil through which light is transmitted between the light conducting panel 24, scale panel 33, and indicator tube 34. While liquid 32 need not have the same index of refraction as the transparent panel 24, it preferably has an index of refraction substantially the same as that of tubes 34. To further enhance viewing of the indicator tubes 34, there is added to the fluid in the tubes a fluorescent dye and a light scattering substance so that the light transmitted to the tubes causes the liquid therein to fluoresce, thus allowing easy visibility of the liquid level. The choice of dyes and light scattering substances is governed by the chemical properties of the material used in the tube and the desired color of the illuminated indicating fluid. Fluorescent dyes which have been successfully used include Rhodamine which fluoresces bright red in solvents containing water and alcohol, and Fluoroscein which fluoresces a bright yellow-green in alkaline water solutions. Pages 2767 through 2777 of "Handbook of Chemistry and Physics," 38th edition, lists a great number of other fluorescent substances which may be utilized in accordance with the instant invention. The light scattering substances are added to the extent required to render the liquid prominently visible and can also be chosen from a wide variety of substances. An annotated bibliography entitled "Light Scattering by Colloidal Systems" by M. M. Fishman, published by Technical Service Laboratories, River Edge, New Jersey, in 1957, lists a variety of suitable materials. Water soluble oils such as naphthalene mineral oils containing petroleum sulfonates have been used in concentrations of 5 to 50 parts per million with water. This combination forms a milky-white emulsion which resists de-emulsification for an extended period of time. It has also been found that fine dispersions of insoluble crystalline mineral substances such as titanium dioxide rutile may be used in higher density liquids. Synthetic latex spheres and various synthetic resinous materials have also been found satisfactory.

It has been found that some solid substances such as zinc sulphide and zinc-seleno-sulphide combine the properties of fluorescence and light scattering. However, it has further been found that such substances suffer depreciation of luminescence due to fine grinding and the absorption of moisture. Therefore separate dissolved dyes and suspended light scatterers are generally believed to be preferable.

Figure 5:
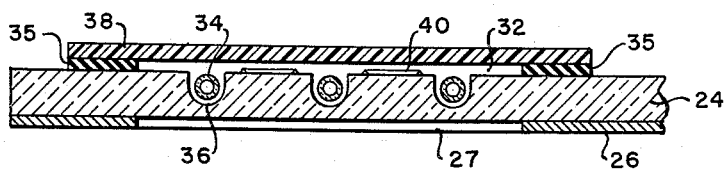
FIG. 5 is a horizontal sectional view of an alternative embodiment of the diving angle indicator shown in FIGS. 1 and 2.

FIG. 5 shows an alternate embodiment of the diving angle indicator wherein a plurality of recesses 36 are provided in light conducting panel 24 for indicator tubes 34. A sealing gasket 32 is provided between panel 34 and a transparent plate 38 which forms the back wall of the chamber confining liquid 32. Indicia 40 are provided on the back surface of light conducting panel 24 instead of on a separate scale panel as in the embodiment shown in FIGS. 3 and 4. In either of these embodiments the appearance of the indicator is that of a plurality of luminous tubes embedded in the plastic. Thus all glare lines due to the curved surfaces of the tubes are eliminated.

Referring now to FIGS. 6–9 wherein the depth error and actual depth indicators are shown in detail, there is provided a metallic backing member 39 forming a fluidproof seal with light conducting panel 24. The inner surface of backing member 39 is again reflective, being either satin finished or mirrored and the fluid tight chamber is filled with light conducting fluid 32 as hereinbefore described. An error indicator scale panel 41 of opaque material, mounted on the inside surface of backing member 39, is wetted by the fluid. A sliding pointer 42, having a reflective front surface, carried through the fluid by a chain 43 driven over a pair of pulleys 44, 46 by positioning-shaft 47, cooperates with scale panel 41. Positioning shaft 47 is carried from its power source through a hole in backing member 39 which is sealed against fluid leakage by an O-ring 48. Actual depth indicator 19 is a plurality of cylindrical scale members 49 of the "counter" type driven by a totalizer shaft 51 which passes through backing member 39 and is sealed by an O-ring seal 52. Again, glare lines are eliminated on the cylindrical counter surface by the immersion of the counter in light transmitting fluid. It will also be realized that the scales due to their immersion in the fluid, appear as being imbedded in the plastic.

Figure 11:
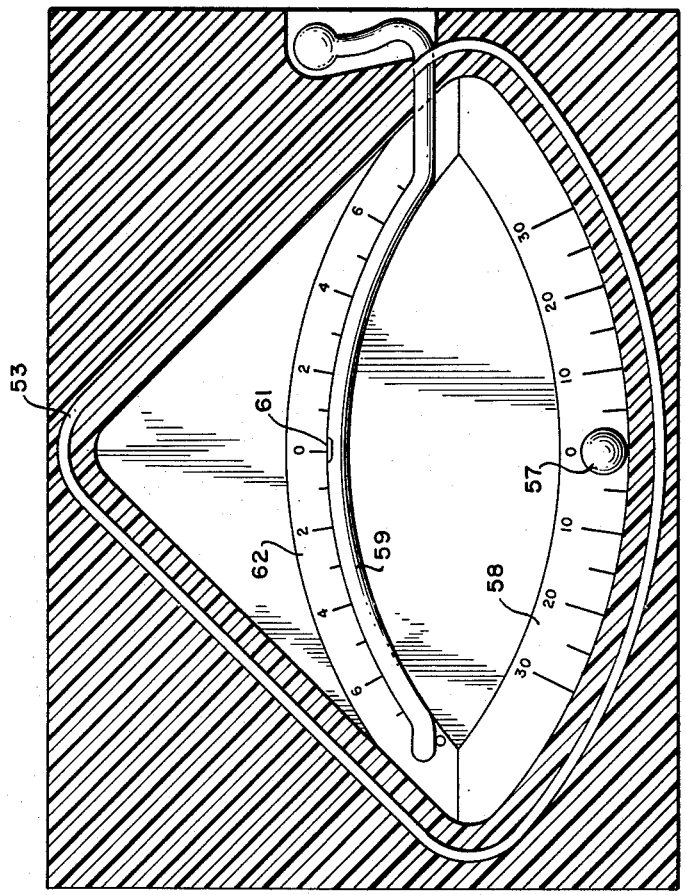
FIG. 11 is a vertical sectional view of the trim angle indicator taken on line XI—XI of FIG. 10.
Figure 10:
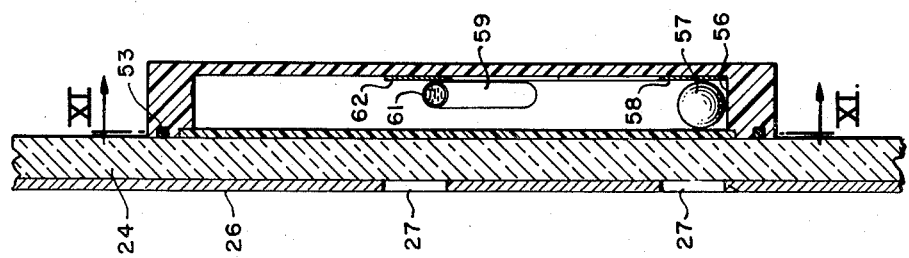
FIG. 10 is a sectional view taken through the trim angle indicator of FIG. 1.

FIGS. 10 and 11 show details of the trim angle indicator. Mounted on the back of light conducting panel 24 and sealed thereto by means of O-ring 53 is a metallic backing member 54 again having a reflective inner surface. The cavity or chamber formed between backing member 54 and light conducting panel 24 is again filled with fluid as hereinbefore described the lower inside surface of backing member 54 forms an arcuate path 56 along which a satin finished metallic ball 57 is designed to roll. A scale 58 is mounted on the rear surface of the chamber behind ball 57. It will be realized that due to friction the ball can only be used when the ship is heeled a large amount. For this reason a fine indicator consisting of an arcuate tube 59 filled with fluid except for a bubble 61 is also provided for measuring small angles. The fluid in tube 59 again includes a light scattering substance and a dye as hereinbefore disclosed. Thus the contents of the tube are rendered prominently translucent and luminous except for the gap occupied by the bubble and the position of the bubble on scale 62 thus becomes easily discernible.

It will be realized that although this invention has been applied to submarine instrument panels that the same principles may be applied to various other instruments without departing from the spirit of the invention.

Obviously many modifications and variations of the present invention are possible in the light of the above teachings. It is therefore to be understood that within the scope of the appended claims the invention may be practiced otherwise than as specifically described.

What is claimed is:

1. An illuminated instrument panel comprising an indicia panel of opaque material having viewing openings therein, a sheet of transparent light transmitting material having a light source extending therein but being otherwise solid throughout its extent; a plurality of instrument enclosure panels of opaque material extending outwardly from said light transmitting material and mounted thereon opposite the openings in said indicia panel and forming recesses between said light transmitting material and said enclosure panels at each of said viewing openings, an instrument indicator in each of said recesses, and a light transmitting liquid filling said recesses whereby light from said light source is transmitted through said light transmitting material and said liquid to illuminate said plurality of instrument indicators.

2. The invention as defined in claim 1 wherein at least one of said instrument indicators is a cylindrical transparent tube containing a liquid indicating medium including fluorescent and light scattering materials.

3. The invention as defined in claim 1 wherein at least one of said instrument indicators includes a metallic ball having a light reflecting surface and designed to roll on an arcuate path through said light transmitting liquid.

4. The invention as defined in claim 1 wherein at least one of said instrument indicators comprises a sliding pointer having a reflective surface, means for moving said sliding pointer through the light transmitting fluid contained in one of said recesses, and an opaque scale cooperating with said pointer and mounted within said recess in a manner whereby the scale face is wetted by said light transmitting fluid.

5. An illuminated instrument panel comprising an indicia panel of opaque material having viewing and indicia openings therein, a sheet of transparent light transmitting material behind and affixed to said indicia panel, said sheet of light transmitting material having a light source extending therein but being otherwise solid throughout its extent; an instrument enclosure panel of opaque material extending outwardly from said light transmitting material and mounted thereon opposite said viewing opening in said indicia panel, said instrument enclosure panel forming a fluid tight recess with said light transmitting material, a cylindrical indicating tube in said recess, indicating fluid containing fluorescent and light scattering materials in said tube, and light transmitting fluid filling said recess whereby glare and highlight lines on said cylindrical surface are eliminated.

6. The invention as defined in claim 5 wherein said tube is arcuate in shape and is filled by said indicating fluid except for a small bubble.

7. The invention as defined in claim 5 wherein said tube is vertical, the height of said indicating fluid in said tube being indicative of the desired measurement.

8. The invention as defined in claim 7 wherein a scale panel is mounted in said recess for cooperation with said indicating fluid.

9. An illuminated instrument panel comprising an indicia panel of opaque material having viewing openings therein, a sheet of transparent light transmitting material having a light source extending therein but being otherwise solid throughout its extent; a plurality of instrument enclosure panels of opaque material extending outwardly from said light transmitting material and mounted thereon opposite the openings in said indicia panel and forming recesses between said light transmitting material and said enclosure panels at at least one of said viewing openings, an instrument indicator in each of said recesses, and a light transmitting liquid filling said recesses whereby light from said light source is transmitted through said light transmitting material and said liquid to illuminate said instrument indicators.

10. The invention as defined in claim 9 wherein at least one of said instrument indicators is a cylindrical transparent tube containing a liquid indicating medium including fluorescent material.

11. The invention as defined in claim 9 wherein at least one of said instrument indicators is a cylindrical transparent tube containing a liquid indicating medium including light scattering material.

12. The invention as defined in claim 9 wherein at least one of said instrument indicators includes a plurality of cylindrical scale members driven by a shaft.

13. An illuminated instrument panel comprising an indicia panel of opaque material having viewing and indicia openings therein, a sheet of transparent light transmitting material behind and affixed to said indicia panel, said sheet of light transmitting material having a light source extending therein but being otherwise solid throughout its extent; an instrument enclosure panel of opaque material extending outwardly from said light transmitting material and mounted thereon opposite said viewing opening in said indicia panel, said instrument enclosure panel forming a fluid tight recess with said light transmitting material, a cylindrical indicating tube in said recess, indicating fluid containing fluorescent materials in said tube, and light transmitting fluid filling said recess whereby glare and highlight lines on said cylindrical surface are eliminated.

14. An illuminated instrument panel comprising an indicia panel of opaque material having viewing and indicia openings therein, a sheet of transparent light transmitting material behind and affixed to said indicia panel, said sheet of light transmitting material having a light source extending therein but being otherwise solid throughout its extent; an instrument enclosure panel of opaque material extending outwardly from said light transmitting material and mounted thereon opposite said viewing opening in said indicia panel, said instrument enclosure panel forming a fluid tight recess with said light transmitting material, a cylindrical indicating tube in said recess, indicating fluid containing light scattering material in said tube, and light transmitting fluid filling said recess whereby glare and highlight lines on said cylindrical surface are eliminated.

References Cited in the file of this patent

UNITED STATES PATENTS

| | | |
|---|---|---|
| 251,371 | Livening | Dec. 27, 1881 |
| 1,780,597 | Mayhall et al. | Nov. 4, 1930 |
| 2,019,411 | Hassel | Oct. 29, 1935 |
| 2,571,894 | Kennelly | Oct, 16, 1951 |
| 2,673,545 | Insul | Mar. 30, 1954 |
| 2,703,547 | Hardesty | Mar. 8, 1955 |
| 2,811,128 | Franck | Oct. 29, 1957 |
| 2,906,232 | Le Van et al. | Sept. 29, 1959 |
| 2,924,022 | Collahan | Feb. 9, 1960 |

FOREIGN PATENTS

| | | |
|---|---|---|
| 631,311 | Great Britain | Nov. 1, 1949 |